United States Patent [19]

Stewart

[11] 3,889,072

[45] June 10, 1975

[54] BI-DIRECTIONAL AMPLIFICATION APPARATUS

[75] Inventor: Alan Stewart, Elk Grove Village, Ill.

[73] Assignee: International Telephone and Telegraph Corporation, New York, N.Y.

[22] Filed: Oct. 19, 1973

[21] Appl. No.: 407,914

[52] U.S. Cl. .......... 179/170 R

[51] Int. Cl. .......... H04b 3/36

[58] Field of Search ...... 179/170 R, 170 NC, 170 T, 179/170.6, 18 AH; 330/14

[56] References Cited

UNITED STATES PATENTS

| | | | |
|---|---|---|---|
| 3,108,157 | 10/1963 | Feiner | 179/170 R |
| 3,180,947 | 4/1965 | Haselton, Jr. et al. | 179/170 NC |
| 3,530,260 | 9/1970 | Gaunt, Jr. | 179/170 NC |
| 3,566,046 | 2/1971 | McCormick et al. | 179/170 R |
| 3,586,881 | 6/1971 | Gaunt, Jr. | 179/170 NC |

OTHER PUBLICATIONS

Appel and Abramson, "Electronic Hybrid For Telephone Using a Differential Amplifier," Oct. 1973, IBM Tech. Disclosure Bulletin, Vol. 16 No. 5, Pages 1513 and 1514.

*Primary Examiner*—Kathleen Claffy
*Assistant Examiner*—Randall P. Myers
*Attorney, Agent, or Firm*—J. B. Raden; M. M. Chaban

[57] ABSTRACT

A voice frequency amplification apparatus is disclosed for use in telecommunications applications such as a trunk circuit interfacing between a single wire speech path and another line which may be a two-wire line to an outside area such as a remote central office. Within the apparatus, the speech path for each direction includes a difference amplifier. The uni-directional characteristics of the amplifiers provide one form of isolation of signals in one path from the signals in the other. The interconnection of the two paths provides relative balance between the input path and the amplifier to provide phase reversal and cancellation of unwanted reflection signals. Within the apparatus, inherent D.C. stability is provided by the inter-relationship and biasing of the amplifiers and the speech paths while A.C. stability is provided by a balance between the gain and the amplifier impedance.

5 Claims, 2 Drawing Figures

BI-DIRECTIONAL AMPLIFICATION APPARATUS

RELATED APPLICATIONS

The present invention comprises an improvement over my copending applications Ser. No. 149,934 filed June 4, 1971, now abandoned, and Ser. No. 347,160 filed Apr. 2, 1973, now U.S. Pat. No. 3,855,431.

BACKGROUND OF THE INVENTION

Bi-directional amplifiers of many types are known. Many of these employ either a single hybrid transformer at one end or hybrid transformers at each end of the amplifier unit.

In the last-filed of the above-noted applications, two transformers are provided one at each end. By balancing the network input impedances, each signal entering the amplifier apparatus is phase-reversed in each entering leg of the apparatus. By phase-reversing the signal in one leg and combining the now in-phase signal with the signal entering the other leg, amplification is provided and removal of unwanted reflection signals is effected.

SUMMARY OF THE INVENTION

Shown is a bi-directional voice frequency amplification apparatus for use in a trunk circuit which interfaces between a single wire, ground return switching network, and a two-wire line to a central office or the like to provide a speech path. Thus the network end is coupled directly to the network while the outside exchange end is terminated in a transformer which has D.C. resistance in the range of 5 ohms.

Provided are operational amplifiers — one for each direction of transmission. The amplifiers are difference amplifiers which respond to a difference between the amplitudes of the signals received at their input pairs and amplify this signal difference. The apparatus has inherent D.C. stability while its stability to low frequency A.C. drift is effected by the amplifier's impedances as balanced against the gain of the amplifier.

It is an object of the invention to provide a new and improved bi-directional amplifier.

It is a further object of the invention to provide a bi-directional amplifier interfacing between a single wire, grounded return speech network, and a two-wire speech network, the amplifier providing a speech path between those two networks.

It is a further object of the invention to provide a bi-directional amplifier interfacing between two single-wire ground return paths using an operational amplifier for each direction of transmission.

Other features, objects and advantages of the invention will become apparent from the detailed description taken in conjunction with the drawings briefly described below.

DETAILED DESCRIPTION OF THE DRAWINGS

Figure 1:
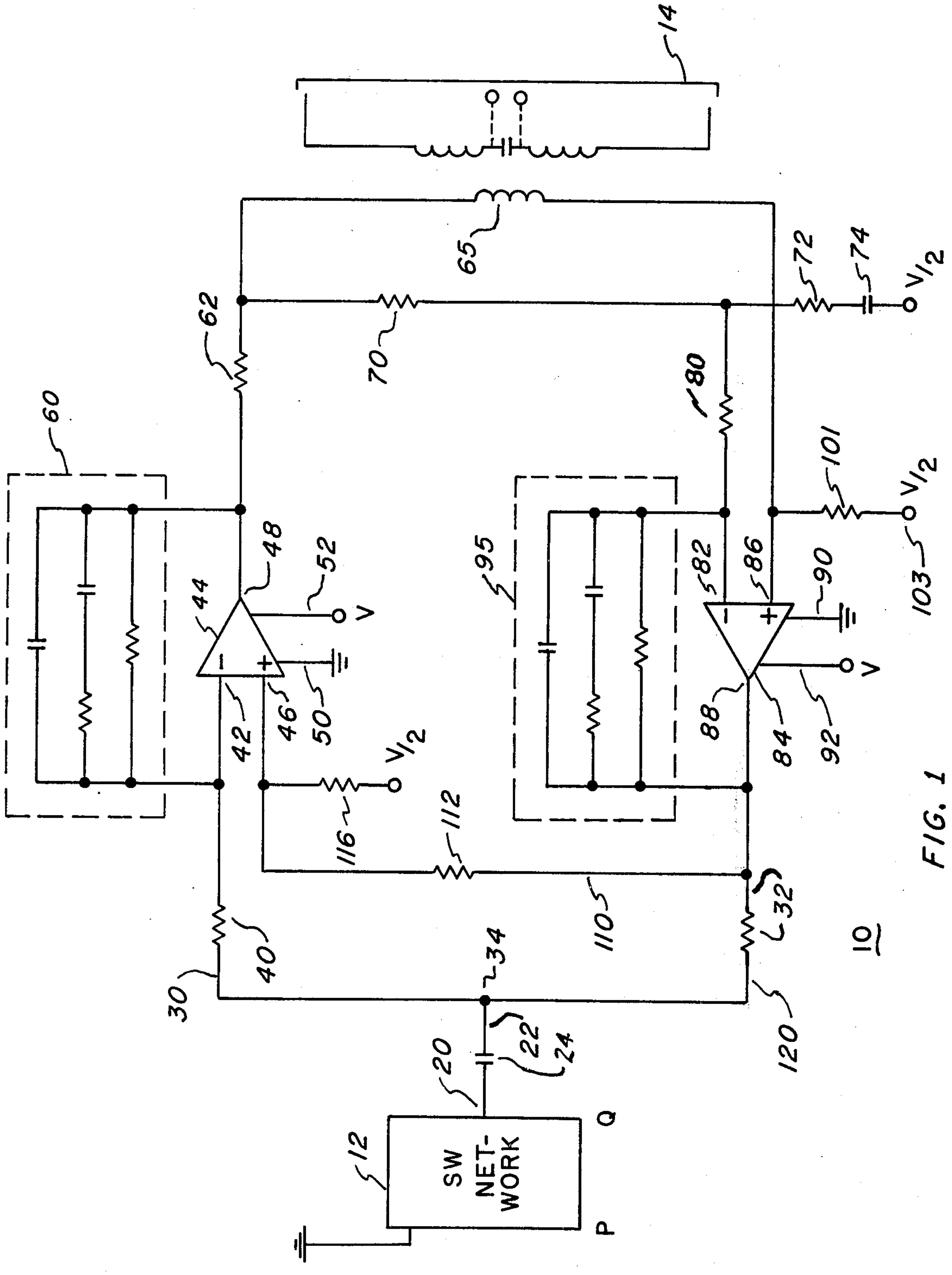
FIG. 1 is a schematic circuit diagram of one embodiment of a bi-directional amplifier apparatus employing my invention.

Turning to FIG. 1, I show amplifying apparatus 10 for use in a telecommunications system of the type shown in co-pending application Ser. No. 283,633 filed Aug. 25, 1972, now abandoned, by J. Reines et al. and previously shown in many patents such as U.S. Pat. No. 3,258,539 issued June 28, 1966 to Mansuetto et al. In the cited application, there is shown a telephone exchange using single-wire network switching for the speech paths. A switching network such as shown in that application is herein designated as box 12. The amplifying apparatus 10 of FIG. 1 is designed for use in a circuit such as a trunk circuit which provides a speech path from switching network 12 to a two-wire line 14, line 14 constituting the pair of conductors leading to an outside exchange. Connecting the apparatus 10 to the terminal 20 of the switching network 12 is a single-wire 22 having a capacitor 24 therein. The capacitor 24 provides D.C. isolation and decoupling between the trunk amplifying apparatus 10 and the switching network 12.

Within the amplifying apparatus 10, there is a left-to-right single wire speech path 30 and a right-to-left speech path 32. These two speech paths are commoned at terminal 34 for connection to conductor 22. Within path 30, viewing the path serially, there is first an input resistor 40 which may have its resistance in the range of 3.9 to 4.0 K. This resistor 40 is connected to the negative input terminal 42 of operational amplifier 44 which may be an operational amplifier of the type known as the 741 amplifier. This amplifier is a two-input amplifier having a positive input terminal 46, negative input terminal 42 and output terminal 48. Amplifier 44 is suitably biased by a ground conductor 50 and a source of positive bias ($V$) on conductor 52 to act as a difference amplifier passing only the difference between the signals received on its two input loads. A feedback and filtering network 60 is connected to the negative terminal 42 and the output terminal 48 and its function will be described more fully later. Output terminal 48 is connected to a load resistor 62, the resistor 62 being of approximately 150 ohms, 150 ohms being approximately the impedance of the line 14 to the remote exchange, when transformed by transformer 65.

Output from load resistor 62 divides or is split into two paths: A first through the primary of transformer 65 leading to the two-wire outside line 14. The transformer is a low-impedance transformer whose D.C. resistance is approximately 5 ohms and is of the 1-to-1-to-1 type prevalent in telephone usage. The second path from load resistor 62 is through the 1 K resistor 70 and may be followed through the low value resistor 72 (50 ohms) and compensating capacitor 74 to a voltage source at the level of $V/2$. The junction between resistors 70 and 72 is also connected through the 500 ohm resistor 80 to the negative terminal 82 of the amplifier 84 to complete a feedback and stabilizing path. Amplifier 84 may be identical to amplifier 44 and configured with a negative input terminal 82, positive terminal 86, output terminal 88, ground terminal 90, and source of bias current 92 at the level of voltage $V$. A feedback and filtering network 95 is also applied to amplifier 84, between its negative input terminal 82 and its output terminal 88.

The right-to-left signal path from transformer 65 may be traced from one leg of the secondary of transformer 65 to the positive input 86 of amplifier 84 and also through low-value resistor 101 to a voltage source 103, the voltage source being at the $V/2$ level. The output paths from output terminal 88 including a feedback path 110 to the positive terminal 46 of amplifier 44 by way of 8.2 K resistor 112. A source of voltage at the

[illegible] $V/2$ feeds the positive input terminal 46 through resistor 116. The speech path 32 further includes a 150 ohm resistor 120 disposed between output terminal 88 and single-wire junction 34.

The circuit diagram of this amplifying apparatus as shown in FIG. 1 is designed for use in a two-way trunk circuit. Bi-directional signal cancellation is achieved differently at each amplifier output because in one case a balanced signal load (to the outside line) is required while in the other (the internal switching network path), a single wire with a ground return is required.

Considering the left-to-right path to the trunk end first, signal cancellation is achieved as follows: A signal present at the output of amplifier 44 appears equally across resistor 62 and across the output transformer, thus an efficient power transfer is obtained when the trunk is terminated with the correct impedance. To prevent amplifier 84 from re-amplifying the output signal and thus reflecting it back to the input of amplifier 44, the amplifier 84 is used as a difference amplifier to cancel the contributions from resistor 70 and the voltage appearing across resistor 101, the latter being a small ground return resistor at the positive input of amplifier 84. Provided that the resistor 72 (in the path with compensating capacitor 74) is chosen correctly, a high degree of signal rejection can be achieved. Signals received from output terminal 48 are not phase-reversed in transformer 65 and appear in phase at the inputs to amplifier 84, leading to their cancellation.

For a signal originating from the trunk and transformer 65, the situation is different. In this case, a 180° phase relationship exists with respect to ground between the voltage appearing across resistor 62 and that appearing across the small ground return resistor, 101. This phase differential is caused by the action of the transformer which provides phase opposed signals at either end of its secondary winding even though these signals may be of different magnitudes. Because of this property, it is possible to provide amplification in amplifier 84, as this amplifier acts to sum the signals appearing at its two input terminals. Thus two-way signals exist at the trunk interface without mutual reaction.

On signals from the line end terminal 20, the cancellation principle is more straightforward. Here, signals appearing at the output 88 of amplifier 84 are cancelled in amplifier 44 in the same manner as discussed previously due to their in-phase relationship at the difference amplifier inputs. But signals originating on the line from terminal 20 appear only at the negative input to amplifier 44. Because of the low output impedance of amplifier 84, no cancellation takes place. Thus, two-way signals can exist at the line interface without initial reaction.

The foregoing explanation assumes theoretical conditions both for the transformer and for the terminating resistors. In a practical situation such as is encountered in real telephone exchange equipment, the process of signal cancellation will be modified by the fact that 180° phase relationships will not exist in all cases. Because of this inexact condition, there will be some degree of interaction between the bi-directional signals. This situation does not present major problems for the following reasons:

Firstly, the amount of gain introduced by the amplifiers 44 and 84 are limited to the total losses of the speech path through the exchange. As these are small, the required amplification is only about 1 or 2 dB. This low gain means that the degree of signal cancellation only has to be sufficient to meet the return loss (reflected signal) requirements of the system.

Secondly, the principle of cancellation employed at the trunk interface, unlike a conventional hybrid junction causes the inherent losses within the transformer to assist the cancellation during improperly terminated conditions. For example, true open circuit or short circuit conditions existing on the trunk cannot be seen by amplifier 84 because the transformer always presents a partial load due to its coupling loss and its ohmic resistance. This means that some small margin of extra gain is available even during these conditions and any loss such as is permitted under the specifications gives an adequate margin of stability.

With the single-ended input, from the switching network, input signals are split in the two paths, and the relationship between the values of resistors 40 and 112 become important. The ratio of the feedback path impedance to the input path impedance of about 10 to 4 produces a comparatively weak signal at input terminal 46. These proportions also provide a gain in the neighborhood of 2.5 to 1.

With gain at this level, i.e., under 3 to 1, the problem of maintaining A.C. stability is minimized, and may be maintained by resistances in the system.

As far as D.C. stability or low frequency A.C. stability, it can be seen that the output of amplifier 44 passes through resistor 62, the 5 ohm impedance of transformer 65 and 10 ohm resistor to $V/2$ source 103 and the positive input terminal 86 of amplifier 84. The output of amplifier 84 passes through resistors 40 and 120 to the negative input terminal 42 of amplifier 44 with capacitor 24 blocking D.C. or low frequency A.C. from the switch network 12. Thus the signal appearing at the negative input is greater than the signal at the positive input of amplifier 44 (provided by resistors 112 and 116) for D.C. or low frequency A.C. With the predominant input of amplifier 44 being negative and the predominant input amplifier 84 being positive, the effect of error or D.C. drift is eliminated due to the net negative feedback around the loop.

In view of these points, it is possible to make the amplifier unconditionally stable for open or short circuit conditions on line or trunk. Although the feedback networks which appear across amplifier 44 and 84 provide some degree of low frequency emphasis to compensate for reactive losses in the speech path this stability factor has been maintained.

Further, in FIG. 1, the feedback paths 60 and 95 each include a filtering network in some cases improving frequency response.

Figure 2:
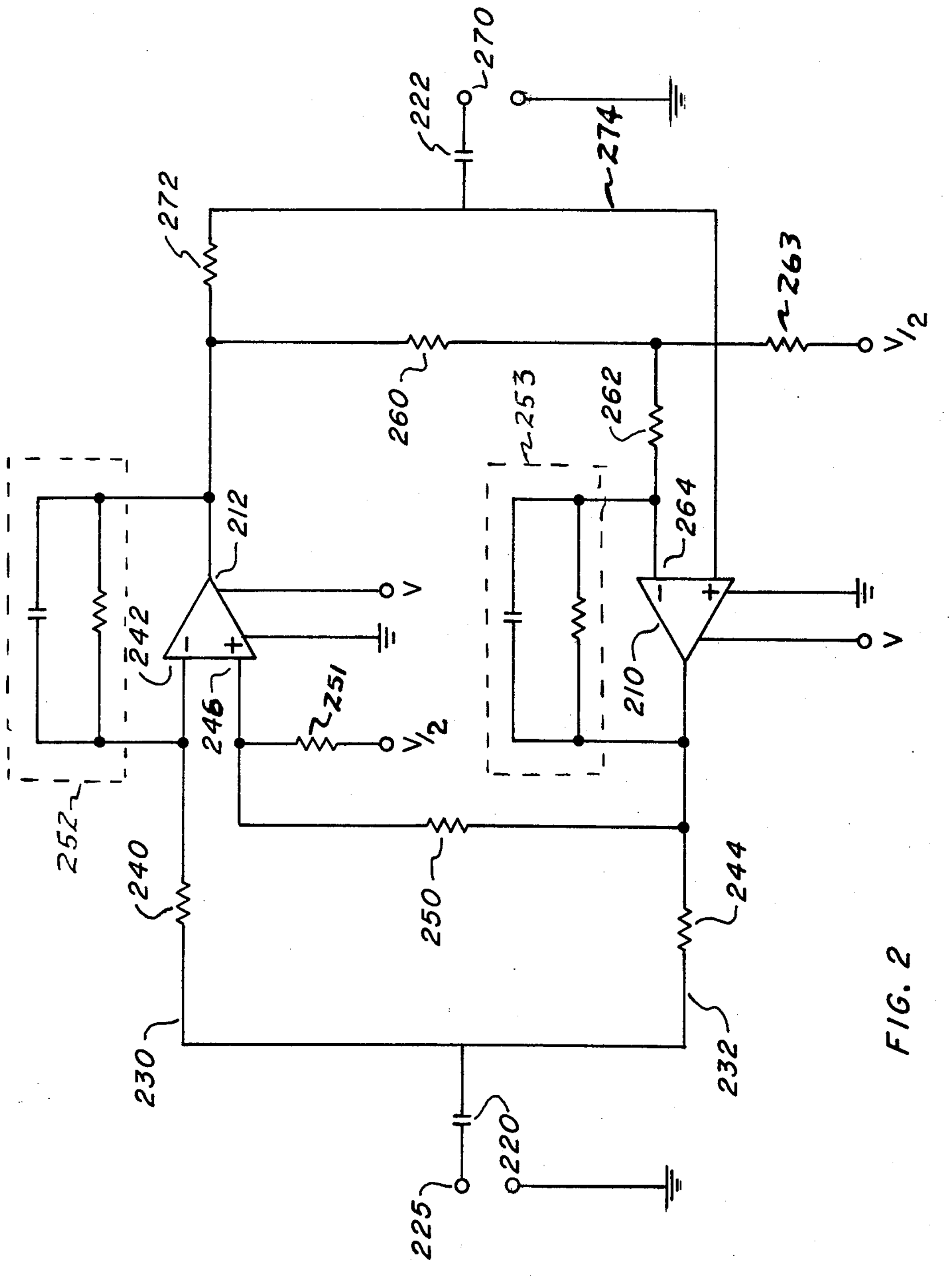
FIG. 2 is a schematic circuit diagram of a further embodiment of an amplifier apparatus using my invention.

In FIG. 2, I show an amplifying apparatus for use without transformers for a systen with single wire, ground return lines at each end. Such use, for example, may be within a local junctor or link circuit of a local exchange. In such application, the line to line connection has to be nominally transparent at voice frequencies. A bi-directional amplifier 210 and 212 is used in each speech path. Each amplifier operates on a simple signal cancellation principle as set out previously to enable small amounts of two-way gain to be introduced to compensate for speech path losses. When some loss is required in the line to line connection, as for instance during PABX applications, then the amplifying apparatus can be wired as an attenuator simply by reducing the value of the feedback resistors in the amplifier. As is the case with the apparatus described previously, relative to FIG. 1, the circuit is unconditionally stable for open or short conditions on the lines.

In the circuit of FIG. 2, the amplifiers 210 and 212 are identical and perform in the same fashion as the amplifiers of FIG. 1. In this system, a single wire line to line system, there is a decoupling capacitor 220 and 222 at each end of the line for D.C. isolation. A.C. signals entering at terminal 225 are divided into paths 230 and 232. The resistance 240 in path 230 is approximately 4 K ohms and leads to the negative terminal 242 of amplifier 212. In the other path 232, is an input resistor 244 of approximately 150 ohms to match the line resistance. The path to the positive input terminal 246 passes through resistor 250 which is approximately 8 K ohms and to a voltage source at the level *V*/2 through resistor 251. Thus the signal to terminal 246 is weak by comparison to the signal to negative terminal 242. The ratio of the resistance of the feedback path 252 when divided by the value of the input resistor 240 constitutes the gain through the amplifier 212 in the amount of approximately 2.5 to 1. Within the network, no inductive components are used.

Within the left-to-right path of FIG. 2, a feedback path through resistors 260, 262 and 263 provide respectively 200 ohms, 6 K ohms and 1 K ohms. This voltage divider and high resistance of 262 tends to attenuate signals to the negative terminal 264 of amplifier 210, the bulk of an AC output signal passing through resistor 272 and capacitor 222.

For the right-to-left path signals from terminal 270 are split through the input matching resistor 272 (150 ohms) and the path over lead 274. The path 274 passes the signals through the amplifier 210 and resistor 244 to terminal 225 via capacitor 220. Feedback through paths 230 and 232 are cancelled by attenuation in the network. This apparatus uses negative feedback in the loop for both AC and DC stability.

I claim:

1. A two-wire, bi-directional voice amplification apparatus adapted to transmit and receive voice frequency signals between a single wire, ground return line coupled to one end of the apparatus and a line coupled to the other end, said apparatus comprising a single wire path for each direction of transmission with both said single wire paths joined to the respective lines at the ends of said apparatus, amplifying means in each path, each said amplifying means including a first and a second input and a single output, means biasing each said amplifying means to a difference amplifier configuration for providing unidirectional signal passage therethrough, the first input to a first of said amplifying means being coupled to said one end of the apparatus and the first input to a second of said amplifying means coupled to the line at the other end, respective feedback networks coupling the second input of each of said amplifying means to the output of the respective other amplifying means for cancelling signals fed back from the respective outputs through the feedback paths, means balancing the first input of said first amplifying means against the second input to cause amplification of signals transmitted to said inputs, and means in the feedback network from the output of said first amplifying means for attenuating AC signals directed to the input to which said network is coupled to prevent noise due to voice frequency alternating current signals and oscillation in said apparatus.

2. A system as claimed in claim 1, wherein each said amplifier comprises an operational amplifier.

3. A two-wire system for bi-directionally transmitting voice frequency signals between a single wire, ground return switching network at one end of said system and a line connected to signal transmitting and receiving means at the other end of said system, said system comprising a first single wire path for one direction of voice frequency transmission and a second single wire path for the other direction of transmission with said paths being joined at the ends thereof to form a closed loop, an operational amplifier in each path biased to perform as a difference amplifier, a first of said amplifiers being disposed in the path for one direction to render said path unidirectional in transmission therethrough, and said second amplifier disposed in the other path to render said path unidirectional, each said amplifier having two inputs and an output, one of said inputs and the output of an amplifier comprising one transmission path and one input and the output of the other amplifier comprising the transmission path for the other direction, the other input of each amplifier comprising a feedback network from the output of the other amplifier, and means in a feedback path for said one direction for attenuating voice frequency signals reflected from the output of the other amplifier to cause cancellation of the reflected signals within the amplifier to which the feedback path forms an input.

4. A transmission system as claimed in claim 3, wherein there is a transformer with one winding thereof coupled to the joinder of said single wire paths at said other end of said system, said transformer disposed to invert thereacross signals from said other end directed to the respective two paths, and means for feeding said inverted signals to the respective inputs of said second amplifier.

5. A system as claimed in claim 3 wherein, said other end line comprises a single-wire ground return line, and in which there is balancing means coupled to each feedback network for balancing input signals for cancellation in the respective amplifiers.

* * * * *